United States Patent
Takehara et al.

(10) Patent No.: US 8,161,630 B2
(45) Date of Patent: Apr. 24, 2012

(54) ROTOR ATTACHMENT APPARATUS AND ROTOR ATTACHMENT METHOD

(75) Inventors: Yoshiaki Takehara, Suzuka (JP); Kiyoshi Inoguchi, Suzuka (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/666,233

(22) PCT Filed: Mar. 3, 2009

(86) PCT No.: PCT/JP2009/053955
§ 371 (c)(1),
(2), (4) Date: Dec. 22, 2009

(87) PCT Pub. No.: WO2009/139212
PCT Pub. Date: Nov. 19, 2009

(65) Prior Publication Data
US 2011/0041321 A1 Feb. 24, 2011

(30) Foreign Application Priority Data
May 16, 2008 (JP) .................. 2008-129696

(51) Int. Cl.
*B23P 19/00* (2006.01)
(52) U.S. Cl. ............... 29/732; 29/596; 29/597; 29/598; 29/736
(58) Field of Classification Search .............. 29/222, 29/739, 732, 596–598; 310/156.48, 156.55, 310/191
See application file for complete search history.

(56) References Cited

U.S. PATENT DOCUMENTS

| 5,737,831 | A * | 4/1998 | Liechty et al. | 29/771 |
| 7,011,618 | B2 * | 3/2006 | Potter | 494/12 |
| 7,415,758 | B2 * | 8/2008 | Hauser et al. | 29/736 |
| 7,757,368 | B2 * | 7/2010 | Uemura et al. | 29/450 |

FOREIGN PATENT DOCUMENTS

| JP | 7-67299 A | 3/1995 |
| JP | 2002-210619 A | 7/2002 |
| JP | 2002-218713 A | 8/2002 |

* cited by examiner

*Primary Examiner* — Minh Trinh
(74) *Attorney, Agent, or Firm* — Arent Fox LLP

(57) ABSTRACT

A rotor attachment apparatus for attaching a rotor of a motor coaxially to a crankshaft by inserting the rotor into a rotor housing that is attached to an engine, including: a rotor support member; rotor positioning members that engage some of a plurality of bolt insertion holes provided in the rotor, to thereby position the rotor; a temporary fixation bolt that temporarily fixes the rotor on the rotor support member; a drive shaft a tip portion of which is engaged with a shaft end portion of the crankshaft, and which supports the rotor support member movably in an axis direction via a screw mechanism; a base member that moves the rotor support member toward and away from the rotor while rotatably supporting a base end of the drive shaft; base positioning members that engage the rotor housing; and a fastening mechanism which engages a head of a coupling bolt inserted into at least one of the bolt insertion holes, and which is supported by the rotor support member so as to bias the coupling bolt toward the rotor.

2 Claims, 7 Drawing Sheets

ROTOR ATTACHMENT APPARATUS AND ROTOR ATTACHMENT METHOD

CROSS-REFERENCE TO RELATED APPLICATION

Priority is claimed on Japanese Patent Application No. 2008-129696, filed on May 16, 2008, the contents of which are incorporated herein by reference.

TECHNICAL FIELD

The present invention relates to a rotor attachment apparatus and a rotor attachment method.

BACKGROUND ART

Conventionally, when attaching (inserting) a rotor with a magnet to (into) a rotor housing with a stator coil, a fixed or movable attachment apparatus is used to make the rotor movable only in the axis direction with respect to the rotor housing so as to prevent an outer circumference (magnets) of the rotor from being magnetically attached to an inner circumference to the rotor housing (for example, see Patent Documents 1 and 2).

Patent Document 1: Japanese Unexamined Patent Application, First Publication No. H07-67299
Patent Document 2: Japanese Unexamined Patent Application, First Publication No. 2002-210619

SUMMARY OF INVENTION

Problems to be Solved by the Invention

The above conventional technique is utilized also for a power unit for a hybrid motor vehicle in which a motor is attached coaxially with a crankshaft of an engine. In this case, the rotor inserted into the rotor housing is coupled to the crankshaft of the engine.

With the recent prevalence of hybrid motor vehicles, automatization of the above attachment operation of the rotor is desired. In this case, to couple the rotor and the crankshaft, which rotate integrally, with high accuracy without axis displacement, the above conventional technique is required to enhance the positioning accuracy of a rotor with respect to the attachment apparatus, and also enhance the positioning accuracy of the attachment apparatus and the rotor with respect to the rotor housing. This results in a problem in that the attachment apparatus has an intricate construction and the attachment operation has complicated steps.

Therefore, it is an object of the present invention to provide a rotor attachment apparatus and a rotor attachment method that make it possible to automate attachment operation, and simplify a construction of an attachment apparatus and steps of the attachment operation, when a rotor of a motor is inserted into a rotor housing for coupling to a crankshaft of an engine.

Means for Solving the Problem

In order to solve the above-described problems, the present invention employs the following. In particular, a rotor attachment apparatus according to the present invention is for coupling a rotor of a motor to a crankshaft of an engine by inserting the rotor into a rotor housing that is attached to the engine when the motor is to be attached coaxially with the crankshaft, the rotor attachment apparatus including: a rotor support member that faces a lateral face of the rotor in an axis direction of the rotor; rotor positioning members that are protrudingly provided on the rotor support member and engage some of a plurality of bolt insertion holes provided in the rotor for coupling to the crankshaft; a temporary fixation bolt that temporarily fixes the rotor on the rotor support member in a state where the rotor is positioned with respect to the rotor support member by the rotor positioning members; a drive shaft which is arranged coaxially with the rotor, a tip portion of which is engaged with a shaft end portion of the crankshaft, and which supports the rotor support member movably in the axis direction via a screw mechanism; a base member that is arranged on a side of the rotor support member opposite to the rotor and moves the rotor support member toward and away from the rotor while rotatably supporting a base end of the drive shaft; base positioning members that are protrudingly provided on the rotor housing side of the base member and engage the rotor housing; and a fastening mechanism which engages a head of a coupling bolt inserted into at least one of the bolt insertion holes other than the ones to be engaged with the rotor positioning members, to thereby impart a torque to the head of the coupling bolt, and which is supported by the rotor support member so as to bias the coupling bolt toward the rotor.

Further, a rotor attachment method according to the present invention is a rotor attachment method using a rotor attachment apparatus that includes: a rotor support member that faces a lateral face of a rotor of a motor in an axis direction of the rotor; rotor positioning members that are protrudingly provided on the rotor support member and engage some of a plurality of bolt insertion holes provided in the rotor for coupling to a crankshaft of an engine; a temporary fixation bolt that temporarily fixes the rotor on the rotor support member in a state where the rotor is positioned with respect to the rotor support member by the rotor positioning members; a drive shaft which is arranged coaxially with the rotor, a tip portion of which is engaged with a shaft end portion of the crankshaft, and which supports the rotor support member movably in the axis direction via a screw mechanism; a base member that is arranged on a side of the rotor support member opposite to the rotor and moves the rotor support member toward and away from the rotor while rotatably supporting a base end of the drive shaft; base positioning members that are protrudingly provided on the base member and engage the rotor housing that is attached to the engine; and a fastening mechanism which engages a head of a coupling bolt inserted into at least one of the bolt insertion holes other than the ones to be engaged with the rotor positioning members, to thereby impart a torque to the head of the coupling bolt, and which is supported by a rotor support member so as to bias the coupling bolt toward a rotor, the method including: a first step of positioning the rotor with respect to the rotor support member by the rotor positioning members before the rotor is inserted into the rotor housing; a second step of temporarily fixing the rotor support member and the rotor on each other by the temporary fixation bolt after the first step; a third step of positioning the base member with respect to the rotor housing by the base positioning members; a fourth step of engaging a tip portion of the drive shaft with a shaft end portion of the crankshaft after the second and third steps; a fifth step of moving the rotor support member and the rotor toward the rotor housing by the drive shaft after the fourth step, to thereby insert the rotor into the rotor housing; a sixth step of releasing the temporary fixation by the temporary fixation bolt and spacing the rotor away from the rotor support member by a biasing force of the fastening mechanism before the rotor is completely inserted into the rotor housing, to thereby making the rotor movable within a range of a clearance between the rotor positioning members and the bolt insertion holes; a seventh step of performing a positioning between the rotor and the crankshaft by engaging the rotor with the shaft end portion of the crankshaft after the sixth step; an eighth step of tightening a coupling bolt by the fastening mechanism after the seventh step, to thereby partly couple the rotor to the crankshaft; and a ninth step of inserting coupling bolts into the other bolt insertion holes and tightening after the eighth step, to thereby completely couple the rotor to the crankshaft.

Advantageous Effects of the Invention

According to the present invention, before the rotor is inserted into the rotor housing, the rotor is positioned with respect to the rotor support member by the rotor positioning members. In this state, the rotor and the rotor support member are temporarily fixed by the temporary fixation bolt. The rotor positioning members engage the bolt insertion hole with a comparatively large tolerance. Accordingly, a comparatively large amount of positional tolerance of the rotor with respect to the rotor support member is secured. This prevents a construction of the rotor support member for positioning the rotor from being intricate, and also prevents operation of attaching the rotor from being complicated. Furthermore, the rotor is temporarily fixed on the rotor support member. Accordingly, a posture change when the rotor and the rotor support member are moved from the temporary placement position for the rotor to the attachment position to the rotor housing is easily performed.

When the rotor temporarily fixed on the rotor support member is inserted into rotor housing, the base member is positioned with respect to the rotor housing by the base positioning members. The positional tolerance of the base member with respect to the rotor housing is allowed to the extent of a clearance between the inner circumference of the rotor housing and the outer circumference of the rotor (to the extent the rotor is insertable into the rotor housing). As a result, a comparatively large amount of positional tolerance of the base member with respect to the rotor housing is secured. This prevents a construction of the base member for positioning the base member with the rotor housing from being intricate, and also prevents operation of attaching the base member to the rotor housing from being complicated.

When the base member is positioned with respect to the rotor housing, the rotor support member is moved sufficiently toward the base member (opposite to the rotor R) beforehand, to thereby protrude the tip of the drive shaft sufficiently toward the rotor further than the rotor support member. As a result, it is possible to engage the tip portion of the drive shaft with the end portion of the crankshaft before the insertion of the rotor into the rotor housing. This prevents the misalignment of the center of axis between the rotor and the crankshaft.

After this, the drive shaft is rotated to move the rotor support member and the rotor toward the rotor housing via the ball screw mechanism. This enables smooth insertion of the rotor into the rotor housing without magnetically attaching the rotor to the inside of the rotor housing.

Before the rotor is completely inserted into the rotor housing, the rotation of the drive shaft is temporarily stopped, and the temporary fixation of the rotor on the rotor support member by the temporary fixation bolt is released. Then, the rotor is spaced apart from the rotor support member due to the biasing force from the fastening mechanism. As a result, the rotor is in a loosely fit state (a floating state) in which the rotor is slightly movable in the axis direction and is movable also in the direction orthogonal to the axis direction within a range of clearance between the rotor positioning members and the bolt insertion holes.

In this state, the drive shaft is rotated again to move the rotor support member and the rotor toward the rotor housing. As a result, the rotor is completely inserted into the rotor housing, to thereby engage the rotor with the end portion of the crankshaft. This makes it possible to position the rotor with respect to the end portion of the crankshaft with high accuracy, without depending on the positional tolerance by the rotor positioning members, the base positioning members, or the like.

In other words, after most of the rotor is inserted into the rotor housing, the temporary fixation of the rotor on the rotor support member is released, to thereby put the rotor in a floating state. In this state, positioning between the rotor and the crankshaft can be directly performed. Therefore, it is possible to perform positioning between the rotor and the crankshaft with a comparatively small tolerance (with high accuracy), without depending on the positional tolerance before the rotor is inserted into the rotor housing.

After the above-described positioning, the coupling bolt is tightened with a fastening apparatus, to thereby partly couple the rotor to the crankshaft. After that, the rotor attachment apparatus is retracted, and the coupling bolt is inserted through another bolt insertion hole and tightened. Thus, the coupling of the rotor to the crankshaft is completed.

As described above, according to the present invention, it is possible to handle a rotor with comparatively low positioning accuracy before the rotor is inserted into a rotor housing. Therefore, it is possible to achieve the automatization and stability of the rotor attachment operation using a commercially available robot. Furthermore, it is possible to simplify the construction of the rotor support member, the base member, and the like, and also to simplify attachment operation of the rotor and the rotor housing. Furthermore, because most portions of the rotor are inserted into the rotor housing to temporarily put the rotor in a floating state and then the rotor is directly positioned with respect to the crankshaft, it is possible to couple the crankshaft to the rotor with high accuracy.

DETAILED DESCRIPTION OF AND BEST MODE FOR CARRYING OUT THE INVENTION

Hereunder is a description of an embodiment of the present invention with reference to the drawings.

Figure 7:
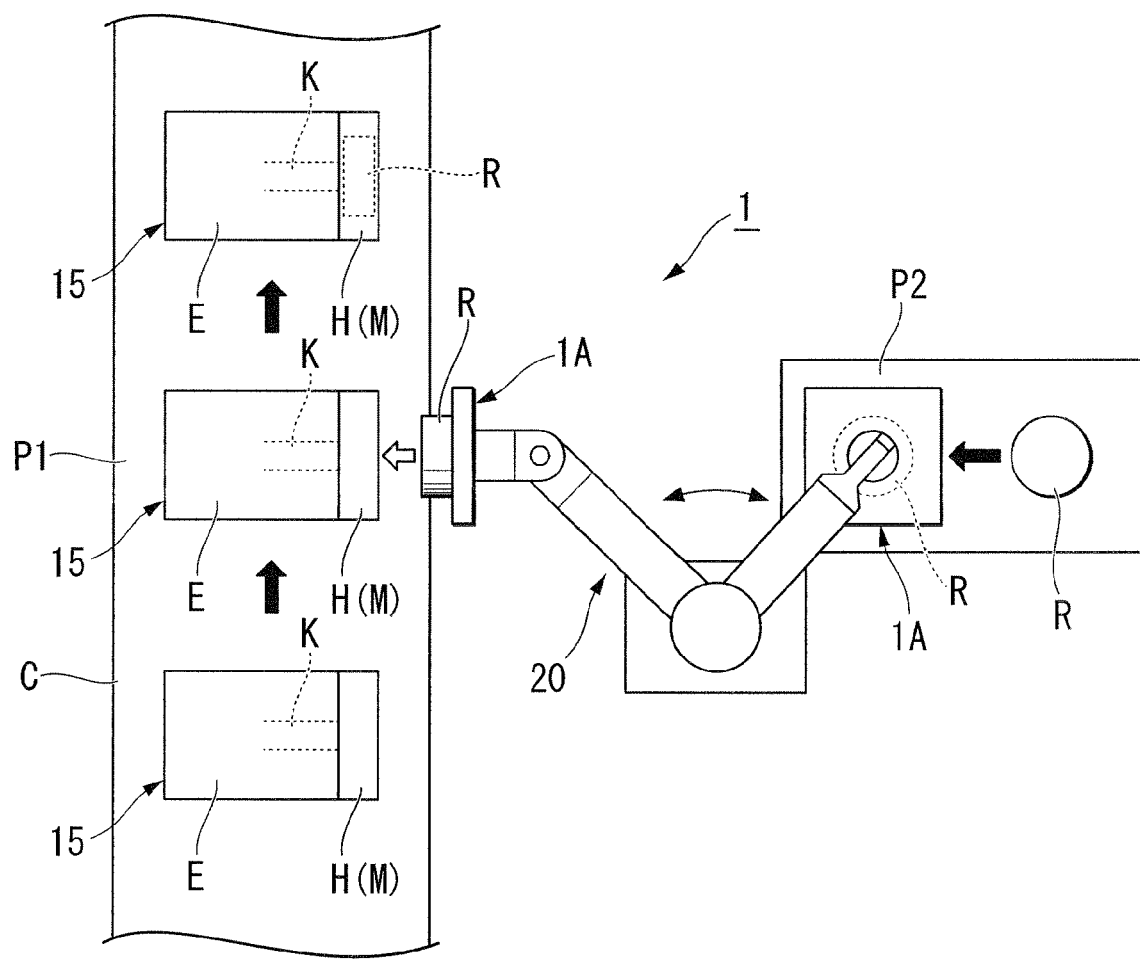
FIG. 7 is an explanatory diagram showing a schematic construction of the whole of the rotor attachment apparatus.

FIG. 7 shows a rotor attachment apparatus 1 for use in an assembly step of a power unit for a hybrid motor vehicle in which an electric motor M is attached coaxially with a crankshaft K of an engine (an internal combustion engine) E. The rotor attachment apparatus 1 inserts a rotor R for the motor M, which has been previously attached to the engine E, into a rotor housing H of the motor M, to thereby integrally couple the rotor R to the crankshaft K of the engine E.

An engine assembly 15 consisting of an engine E and a rotor housing H previously attached to the engine E is transferred by a conveyor C. When the engine assembly 15 reaches a predetermined rotor attachment position P1, attachment operation of the rotor R by the rotor attachment apparatus 1 is performed. The rotor attachment apparatus 1 consists of a robotic arm 20 and an apparatus main unit 1A integrally installed on the tip portion thereof. The operation of the rotor attachment apparatus 1 is controlled by an electronic control portion (not shown in the figure).

The rotor attachment apparatus 1 uses the apparatus main unit 1A to hold the rotor R which has been transferred and placed onto a temporary placement table (a temporary placement position) P2, and to attach the rotor R to the engine assembly 15 at the attachment position P1.

Figure 1:
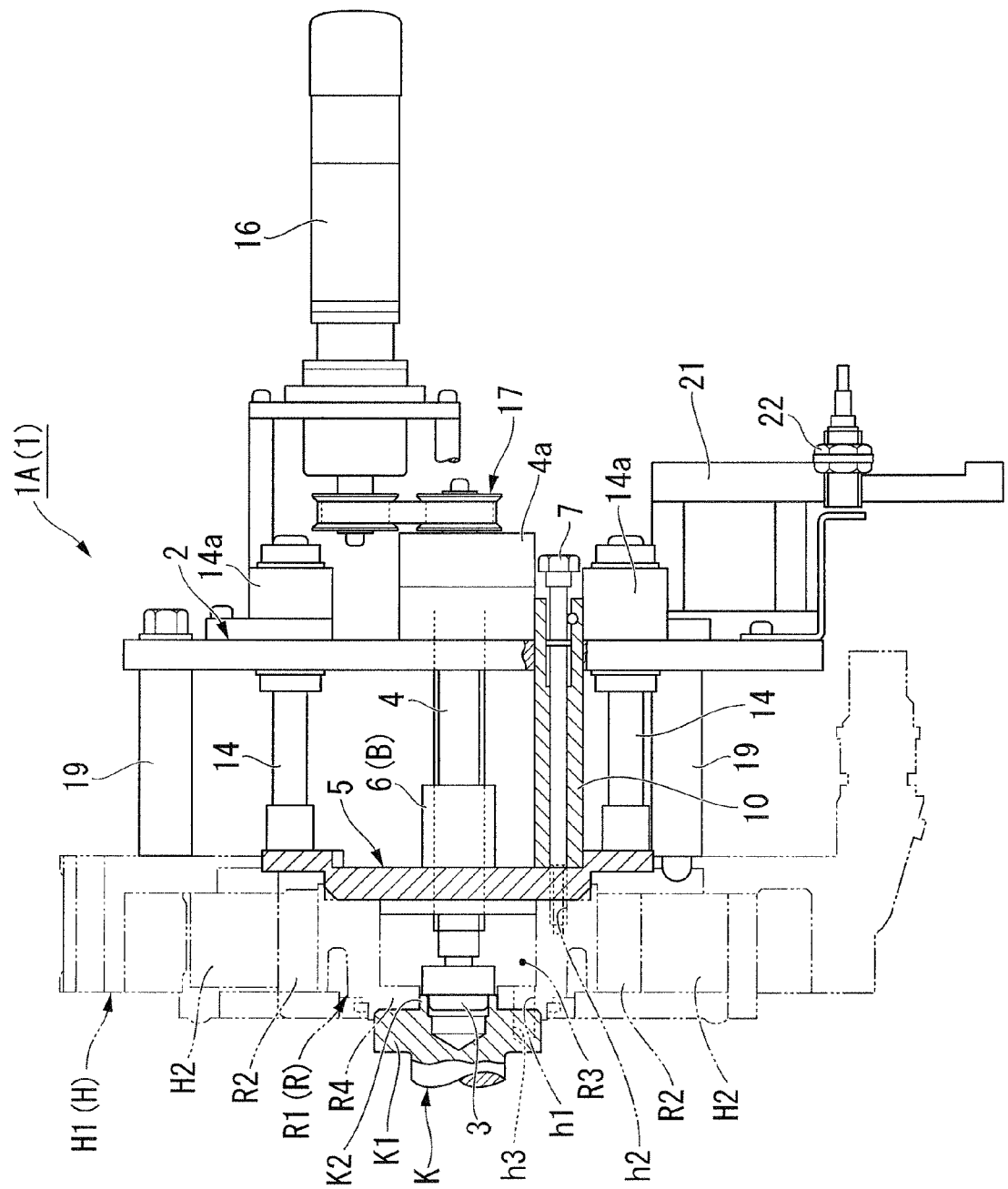
FIG. 1 is a side view showing a rotor attachment apparatus according to an embodiment of the present invention, including a cross sectional view showing a part thereof.
Figure 6:
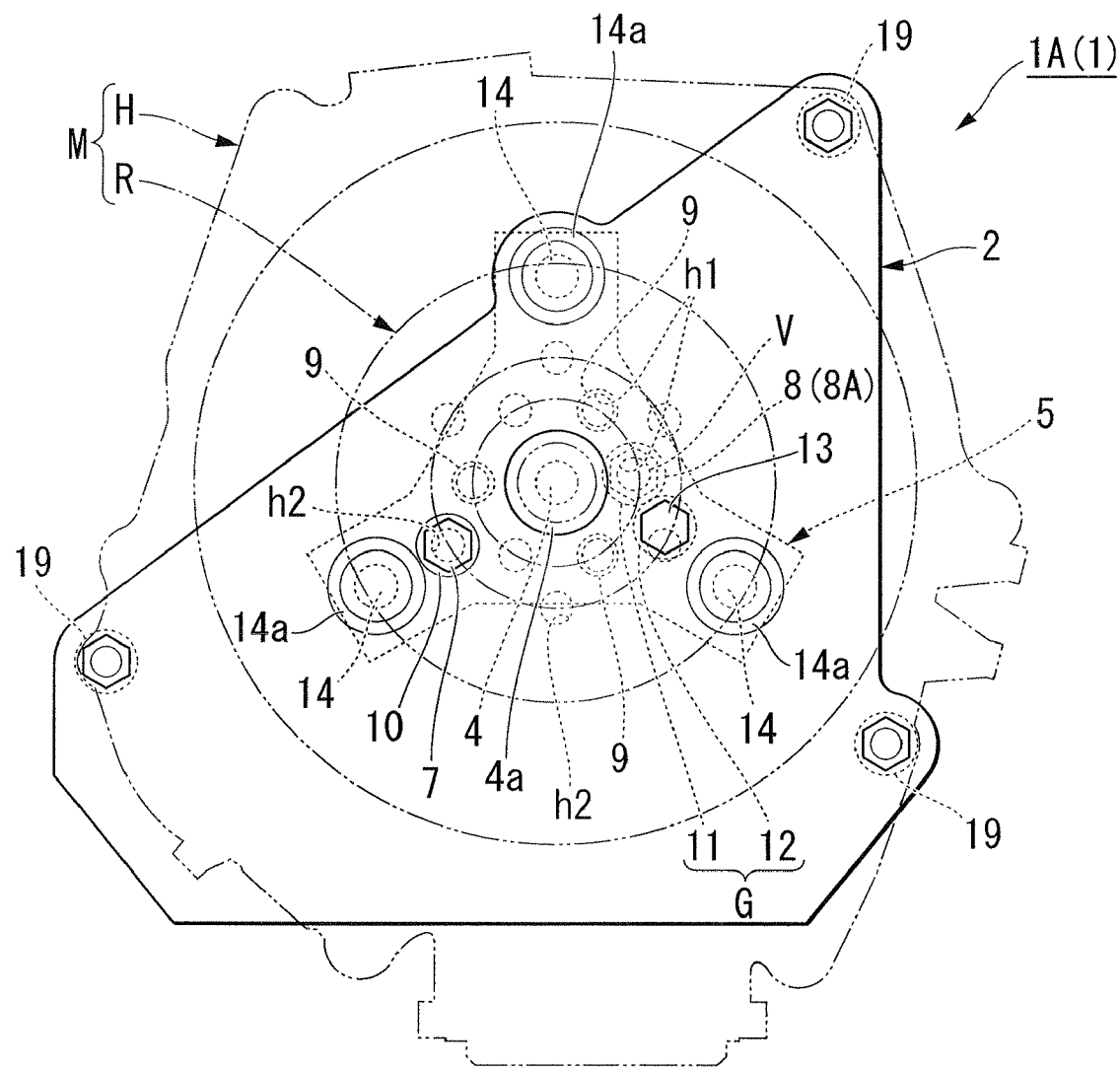
FIG. 6 is a plan view showing a main unit and a motor of the rotor attachment apparatus when seen from the axis direction.

Referring to FIGS. 1 and 6, the rotor housing H consists of a housing main unit H1 and a plurality of stator coils H2 arranged annularly along the inner circumference thereof. The rotor housing H has a low-profile shape with its thickness in the axis direction being comparatively small. One lateral face of the rotor housing H (the housing main unit H1) is fastened and fixed onto an end face of a crankcase (not shown in the figures) of the engine E with bolts or the like.

On the other hand, the rotor R consists of a rotor main unit R1 and a plurality of magnets R2 arranged annularly along the outer circumference thereof. Similarly to the rotor housing H, the rotor R has a low-profile shape with its thickness in the axis direction being comparatively small. At the central portion of the rotor R (the rotor main unit R1), a hollow portion R3 is provided. An inner flange portion R4 provided on the crankshaft K side of the hollow portion R3 is in abutment and engagement with the shaft end portion K1 of the crankshaft K. In a state with the inner flange portion R4 positioned coaxially with the shaft end portion K1, the inner flange portion R4 and the shaft end portion K1 are to be integrally coupled by means of a plurality of (six, in this embodiment) coupling bolts V (see FIGS. 3 and 6).

Figure 3:
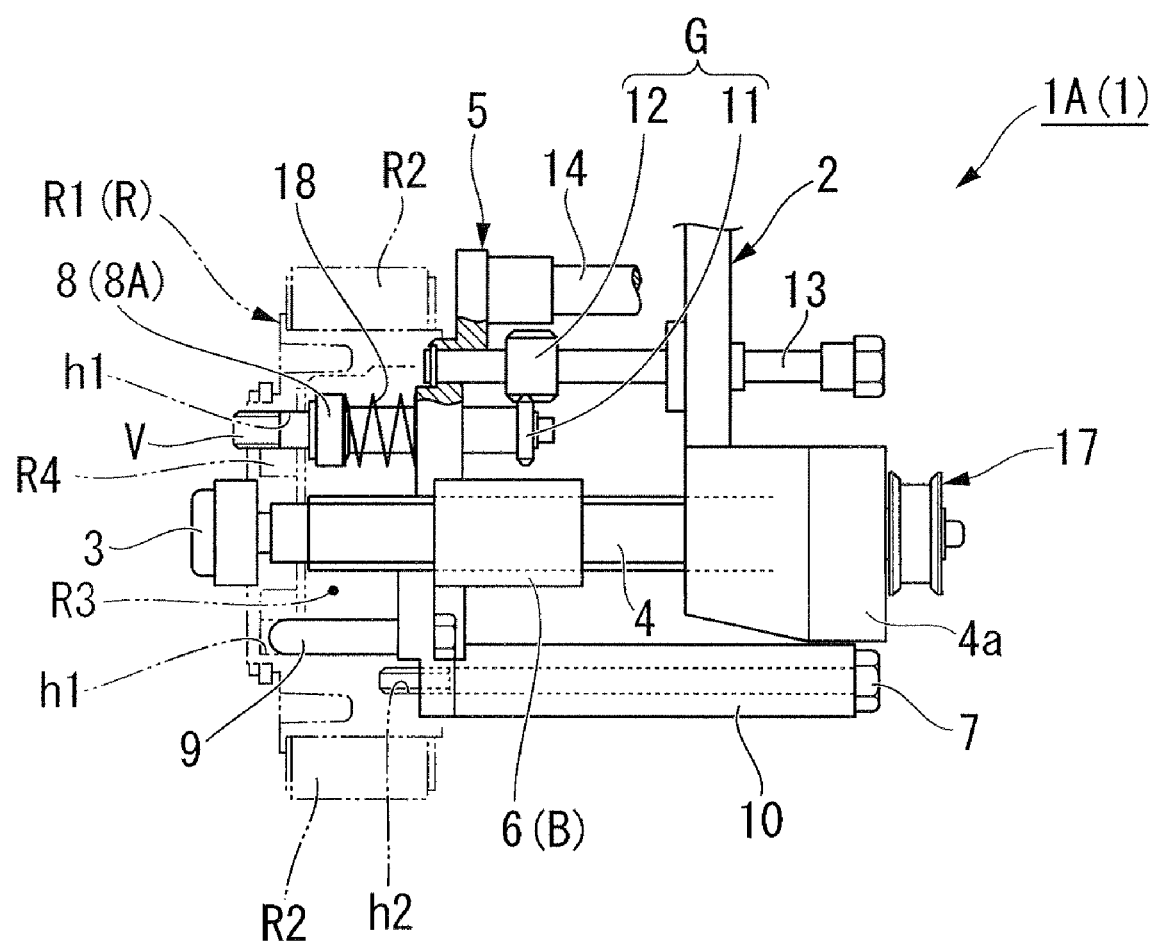
FIG. 3 is a side view showing a part of the construction of the rotor attachment apparatus before the rotor is inserted into the rotor housing, seen from a direction different from that in FIG. 1.

Referring to FIGS. 1, 3, and 6, the apparatus main unit 1A includes: a plate-shaped rotor support member 5 that abuts and engages an end portion of one side (the side opposite to the crankshaft K) in the axis direction of the rotor R (the rotor main unit R1); a plurality of (three, in this embodiment) pin-shaped rotor positioning members 9 that are protrudingly provided on the rotor R side of the rotor support member 5 and respectively engage some (three) of a plurality of (six) bolt insertion holes h1 in the rotor main unit R1 for coupling to the crankshaft K; a temporary fixation bolt 7 that temporarily fixes the rotor R on the rotor support member 5 in a state with the rotor R being positioned with respect to the rotor support member 5 by the rotor positioning members 9; a drive shaft 4 which is provided coaxially with the rotor R, an end of which engages an inner circumference of a collar portion K2 at the center of the shaft end portion K1 of the crankshaft K, and which supports the rotor support member 5 movably in the axis direction via the ball screw mechanism B; a plate-shaped base member 2 that is arranged so as to face the side of the rotor support member 5 opposite to the rotor R, and moves the rotor support member 5 toward and away from the rotor R while rotatably supporting the base end of the drive shaft 4; a plurality of (three) pin-shaped base positioning members 19 that are protrudingly provided on the rotor housing H side of the base member 2 and engage an outer circumference of the housing main unit H1; and a fastening mechanism 8A that engages a head of a coupling bolt V inserted into one of the bolt insertion holes h1 other than the ones engaged with the rotor positioning members 9, to thereby impart a torque to the coupling bolt V, and is also supported by the rotor support member 5 so as to bias the coupling bolt V toward the rotor R.

The rotor support member 5 has a substantially triangular shape when seen in a planar view (seen in axis direction). Each apex portion of the rotor support member 5 is provided with a guide pin 14 that protrudes in the direction opposite to the rotor R. A tip of each guide pin 14 is slidably held by the base member 2.

With the abutment of one lateral face of the rotor support member 5 against the surface around the hollow portion R3 of the rotor R (the rotor main unit R1), the rotor support member 5 is positioned in the axis direction. Furthermore, with the engagement of the tip portions of the rotor positioning members 9 with the bolt insertion holes h1, the rotor support member 5 is positioned in the direction orthogonal to the axis direction. The rotor support member 5 positioned as described above is temporarily fixed on the rotor R with the temporary fixation bolt 7.

The temporary fixation bolt 7, which has a long shaft portion, is inserted through a guide barrel 10 and held. One end of the guide barrel 10 is fixed on the rotor support member 5. On the other hand, the other end thereof is slidably inserted through the base member 2. The other end of the guide barrel 10 is used as a bearing surface for the head of the temporary fixation bolt 7. The temporary fixation bolt 7 fastens the rotor support member 5 and the rotor R with each other via the guide barrel 10. In this state, the rotor support member 5 and the rotor R are movable toward and away from the base member 2. Even in a state with the rotor support member 5 separated most from the base member 2, the head of the temporary fixation bolt 7 protrudes to the side of the base member 2 opposite to the rotor support member 5.

Around the hollow portion R3 of the rotor R (the rotor main unit R1), a plurality of (six) screw holes h2 are formed for coupling to an output shaft (not shown in the figures) of a hybrid motor vehicle. Into one of the screw holes h2, a screw portion on the tip of the temporary fixation bolt 7 is screwed.

The drive shaft 4 has at its tip a center member 3 for being spigot-fitted into the shaft end portion K1 of the crankshaft K. On an outer circumference of the drive shaft 4, there is formed a thread for the ball screw mechanism B. On the other hand, a barrel-shaped nut 6 of the ball screw mechanism B is fixed at the central portion on the side of the rotor support member 5 opposite to the rotor R. With the screwing on of the drive shaft 4 into the barrel-shaped nut 6, the rotor support member 5 is movably supported by the drive shaft 4.

The base member 2 has substantially a triangular shape larger than that of the rotor support member 5 when seen in a planar view. In the vicinity of each apex of the base member 2, one of the base positioning members 19 is fixed. The tip portions of the base positioning members 19 respectively engage some of (three) screw holes (not shown in the figures) for coupling to a unit case on the outer circumference of the housing main unit H1. For example, two of the base positioning members 19 have a protrusion portion at their tip for insertion into the screw hole, and a tip of one of the base positioning members 19 only abuts against the bearing surface of the screw hole.

On the side of the base member 2 opposite to the rotor housing H, there are fixed slide-hold portions 14a for slidably holding the tip of the guide pins 14, and a rotation-hold portion 4a for rotatably holding the base of the drive shaft 4. The base end of the drive shaft 4 extends through the rotation-hold portion 4a. To the end of the drive shaft 4, a drive force of an electric motor 16 is input via for example a belt-type transmission mechanism 17. In the figure, reference numeral 22 denotes a sensor for detecting the fact that the base member 2, and consequently the apparatus main unit 1A, has been installed at a specified position with respect to the robotic arm 20. Reference numeral 21 denotes a sensor support plate fixed on the tip portion of the robotic arm 20.

The fastening mechanism 8A has: a socket 8 with a shaft portion that is rotatably and slidably held by the rotor support member 5; a coil spring 18 for biasing the socket 8 toward the rotor R (the crankshaft K side); and a socket drive shaft 13 one end of which is rotatably held by the rotor support member 5 and the other end of which is rotatably and slidably held by the base member 2.

The socket drive shaft 13 is arranged on an axis different from that of the socket 8. These interlock each other via a gear pair G. Of the gear pair G, for example a drive gear 12 provided on the socket drive shaft 13 has a comparatively large width in the axis direction of the socket drive shaft 13. In this case, it is possible to move the drive gear 12 a predetermined amount in the axis direction while the drive gear 12 is meshed with the follower gear 11 provided on the socket 8. A bolt head provided on the other end of a socket drive shaft 13 protrudes to the side of the base member 2 opposite to the rotor support member 5 even in a state with the rotor support member 5 separated most from the base member 2.

Next is a description of a procedure of attaching the rotor R to the engine assembly 15 by use of the rotor attachment apparatus 1.

First, referring to FIGS. 3, 6, and 7, the rotor R is placed on the temporary placement table P2 so that the axis direction thereof is along the up-down direction. Through any of the bolt insertion holes h1 of the rotor R, a single coupling bolt V is inserted beforehand. After that, the rotor R is held on the apparatus main unit 1A that is installed on the tip portion of the robotic arm 20. At the rotor attachment position P1 on the conveyor C, the engine assembly 15 is placed so that the axis direction thereof is horizontal.

In the apparatus main unit 1A, with the bottom surface of the rotor support member 5 being in abutment with the end face of the rotor main unit R1 and also the tip portions of the rotor positioning members 9 being in engagement with the bolt insertion holes h1, the rotor R is positioned with respect to the rotor support member 5. In this state, the temporary fixation bolt 7 is screwed onto and tightened into the corresponding screw hole h2, to thereby temporarily fix the rotor R on the rotor support member 5, and consequently the apparatus main unit 1A, securely. At this time, the socket 8 of the fastening mechanism 8A is in engagement with the head of the single coupling bolt V. In addition, the coupling bolt V is put in a state of being biased toward the rotor R. Note that the tightening of the temporary fixation bolt 7 is performed by a nut runner (not shown in the figures).

Here, the rotor positioning member 9 engages the bolt insertion hole h1 with a comparatively large tolerance. Accordingly, a comparatively large amount of positional tolerance of the rotor R with respect to the rotor support member 5 is secured. This prevents a construction of the rotor support member 5 for positioning the rotor R from being intricate and also prevents operation of attaching the rotor R from being complicated. Furthermore, the rotor R is temporarily fixed on the rotor support member 5. Accordingly, a posture change when the rotor R and the rotor support member 5 are moved from the temporary placement position for the rotor R to the attachment position P1 to the rotor housing H is easily performed.

Next, the robotic arm 20 rotates the apparatus main unit 1A and the rotor R by 90° to make the axis direction horizontal. Furthermore, after arranging the rotor R coaxially with the crankshaft K and the rotor housing H of the engine assembly 15 at the rotor attachment position P1 on the conveyor C, the robotic arm 20 brings the rotor R close to the rotor housing H along the axis direction. At this time, the rotor R is temporarily fixed on the apparatus main unit 1A securely. Therefore, it is possible to handle the comparatively heavy rotor R without backlash or the like. This prevents a scratch or the like on the rotor R due to contact with the apparatus main unit 1A or the rotor housing H.

Figure 2:
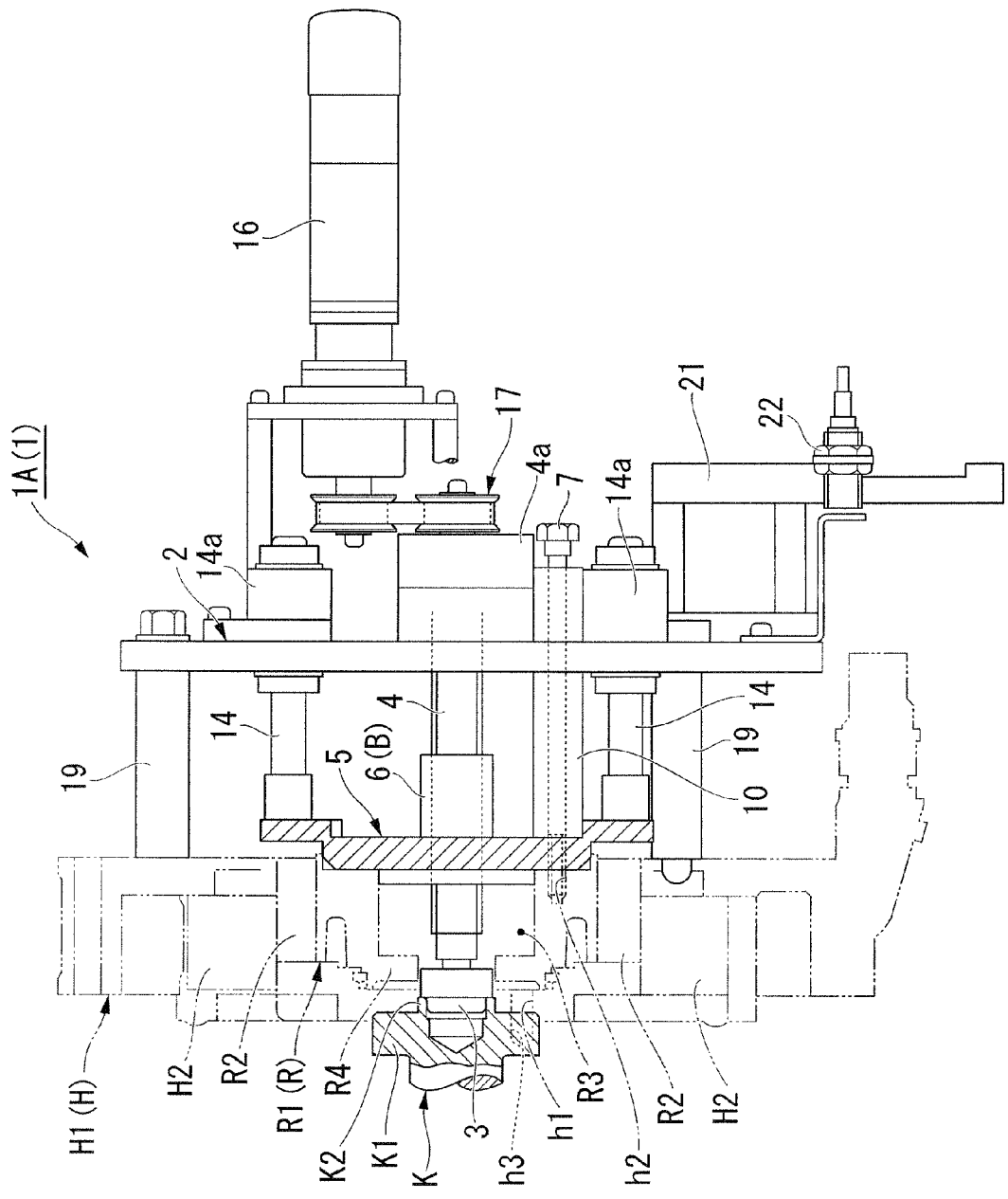
FIG. 2 is a side view showing a state before a rotor is completely inserted into a rotor housing.

Referring to FIG. 2, the apparatus main unit 1A is positioned with respect to the rotor housing H by positioning the base member 2 with respect to the rotor housing H in the axis direction and the direction orthogonal to the axis direction by means of the base positioning members 19. The positional tolerance of the base member 2 with respect to the rotor housing H at this time is allowed to the extent of a clearance between the inner circumference of the rotor housing H and the outer circumference of the rotor R (in the present embodiment, 0.4 to 0.9 mm, in other words, to the extent the rotor R is insertable into the rotor housing H). As a result, a comparatively large amount of positional tolerance of the base member 2 with respect to the rotor housing H is secured. This prevents a construction of the base member 2 for positioning the base member 2 with the rotor housing H from being intricate, and also prevents operation of attaching the base member 2 to the rotor housing H from being complicated.

When the base member 2 is positioned with respect to the rotor housing H, the rotor support member 5 is moved sufficiently to the base member 2 (opposite to the rotor R) beforehand, to thereby protrude the tip of the drive shaft 4 sufficiently toward the rotor R further than the rotor support member 5. As a result, it is possible to engage the tip portion of the drive shaft 4 with the shaft end portion K1 of the crankshaft K before the insertion of the rotor R into the rotor housing H and also simultaneously with the engagement of the base positioning members 19 with the rotor housing H. This prevents the misalignment of center of axis between the rotor R and the crankshaft K.

After that, the electric motor 16 is used to rotate the drive shaft 4, to thereby move the rotor support member 5 and the rotor R toward the rotor housing H via the ball screw mechanism B. Because the rotor R is positioned with respect to the rotor housing H securely via the apparatus main unit 1A, it is possible to insert the rotor R into the rotor housing H without swinging in the direction orthogonal to the axis direction. This never results in scratches or try and failure due to the rotor R being magnetically attached to the interior of the rotor housing H.

Figure 4:
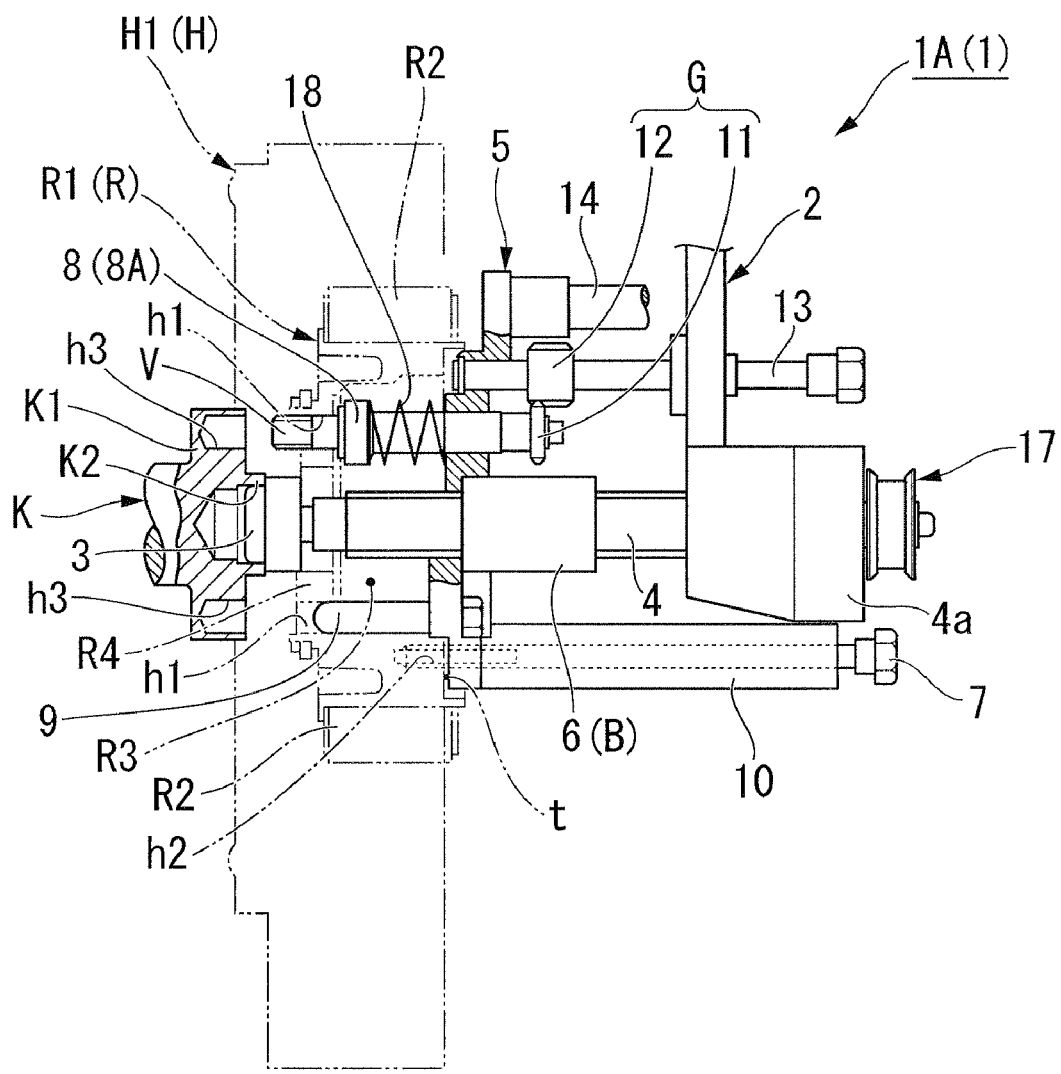
FIG. 4 is a side view showing a state in which a temporary fixation of the rotor on a rotor support member is released from the state of FIG. 2.

Referring to FIG. 4, before the rotor R is completely inserted into the rotor housing H (to be more specific, in a state where most portion of the rotor R is inserted into the rotor housing H but the bottom portion of the rotor R (the inner flange portion R4) is not in engagement with the shaft end portion K1 of the crankshaft K), the rotation of the drive shaft 4 is temporarily stopped, and the temporary fixation of the rotor R on rotor support member 5 by the temporary fixation bolt 7 is released.

Then, the rotor R is moved to the crankshaft K and is spaced apart from the rotor support member 5 (the clearance produced at this time between the rotor R and the rotor support member 5 is shown by reference character t in the figure)

due to the biasing force from the fastening mechanism 8A. As a result, the rotor R is in a loosely fit state (a floating state) in which the rotor R is slightly movable in the axis direction and is movable also in the direction orthogonal to the axis direction within a range of clearance between the rotor positioning members 9 and the bolt insertion holes h1.

Figure 5:
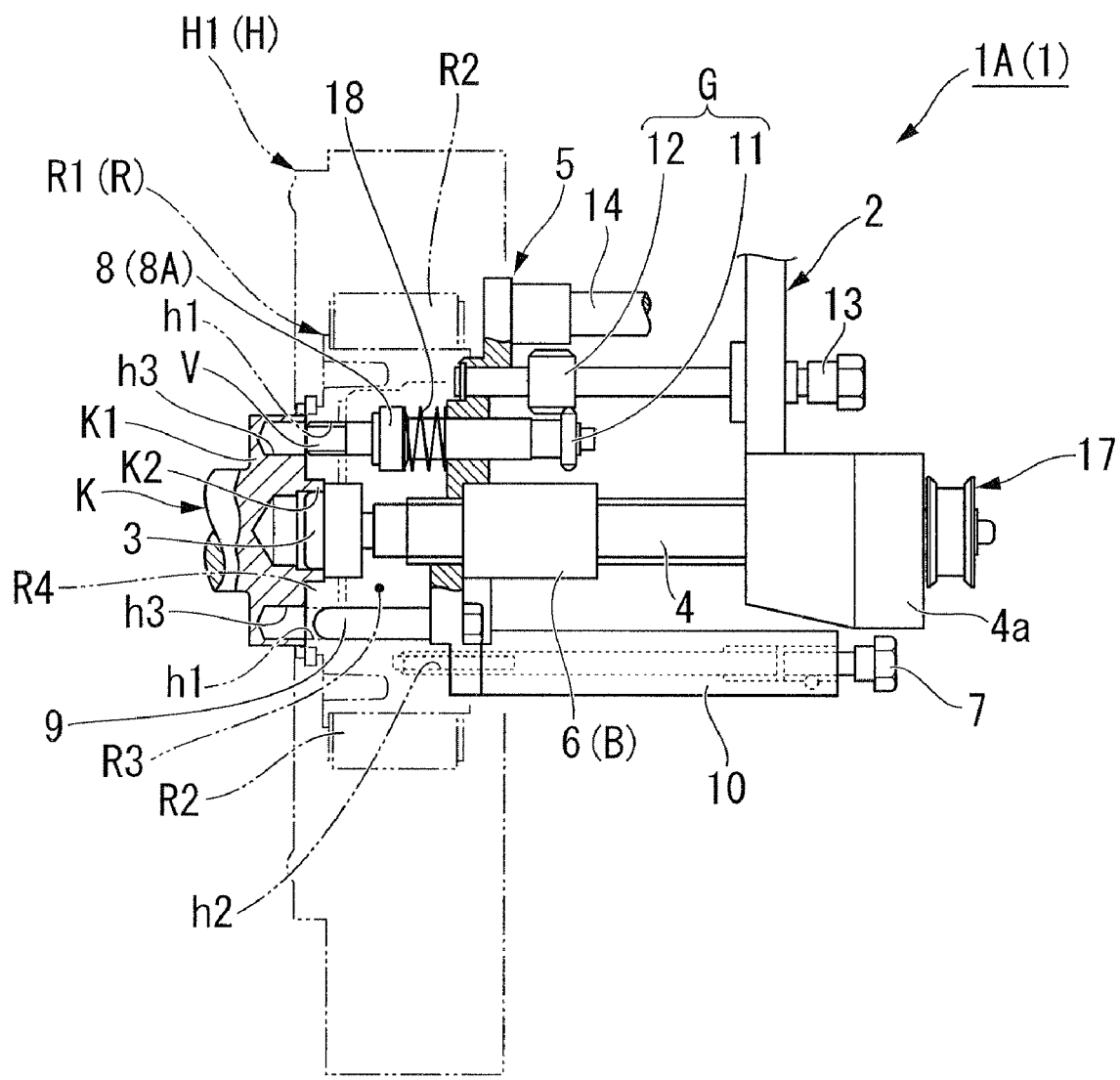
FIG. 5 is a side view showing a state in which the rotor is completely inserted into the rotor housing from the state of FIG. 4.

In this state, the drive shaft 4 is rotated again to move the rotor support member 5 and the rotor R toward the rotor housing H. Consequently, as shown in FIG. 5, the rotor R is completely inserted into the rotor housing H, to thereby engage the inner circumference of the inner flange portion R4 of the rotor R with the outer circumference of the collar portion K2 of the shaft end portion K1 of the crankshaft K. The fitting of the inner circumference of the inner flange portion R4 into the outer circumference of the collar portion K2 has the most rigid clearance accuracy among the positioning devices for the rotor R and the crankshaft K. Therefore, the spigot-fitting of the inner flange portion R4 onto the collar portion K2 coincides the center of axis of the rotor R with that of the crankshaft K with high accuracy.

That is, with the positional tolerance by the rotor positioning members 9, the base positioning members 19, and the like before the rotor R is inserted into the rotor housing H, it is possible to secure the accuracy enough for the rotor R to be inserted into the rotor housing H. However, with the aforementioned simple construction and steps, it is difficult to coincide the center of axis of the rotor R with that of the crankshaft K with high accuracy.

Therefore, firstly, after most portion of the rotor R is inserted into the rotor housing H, the temporary fixation of the rotor R on the rotor support member 5 is released, to thereby temporarily put the rotor R in a floating state in the rotor housing H. In this state, the positioning between the rotor R and the crankshaft K is performed again directly by the inner flange portion R4 and the collar portion K2. Thereby, it is possible to correctly position the rotor R with respect to the shaft end portion K1 of the crankshaft K with a comparatively small tolerance (with high accuracy) by the inner flange portion R4 and the collar portion K2, without depending on the positional tolerance by the rotor positioning members 9, the base positioning members 19, and the like.

After the above positioning, the socket drive shaft 13 in the fastening mechanism 8A is rotated by a nut runner apparatus (not shown in the figure). With the rotation of the socket drive shaft 13, the socket 8 is rotated via the gear pair G. As a result, the coupling bolt V is screwed on and tightened into a screw hole h3 formed in the shaft end portion K1 of the crankshaft K. The displacement of the coupling bolt V with respect to the rotor R in the axis direction is absorbed by the slide of the socket 8 with respect to the rotor support member 5. With the coupling bolt V, the rotor R and the crankshaft K are partly coupled. After that, the rotor attachment apparatus 1 is retracted, and coupling bolts V are inserted through the other bolt insertion holes h1 and screwed. Through the above steps, the coupling of the rotor R to the crankshaft K is completed.

As described above, the rotor attachment apparatus 1 in the above embodiment is for coupling a rotor R of a motor M to a crankshaft K of an engine E by inserting the rotor into a rotor housing H that is attached to the engine E when the motor M is to be attached coaxially with the crankshaft K of the engine E, including: a rotor support member 5 that is opposed to an end face on one side in an axis direction of the rotor R; rotor positioning members 9 that are protrudingly provided on the rotor R side of the rotor support member 5 and engage some of a plurality of bolt insertion holes h1 provided in the rotor R for coupling to the crankshaft K; a temporary fixation bolt 7 that temporarily fixes the rotor R on the rotor support member 5 in a state with the rotor R being positioned with respect to the rotor support member 5 by the rotor positioning members 9; a drive shaft 4 which is arranged coaxially with the rotor R, a tip portion of which is engaged with a shaft end portion K1 of the crankshaft K, and which also supports the rotor support member 5 movably in an axis direction via a ball screw mechanism B; a base member 2 that is arranged on a side of the rotor support member 5 opposite to the rotor R and moves the rotor support member 5 toward and away from the rotor R while rotatably supporting a base end of the drive shaft 4; base positioning members 19 that are protrudingly provided on the rotor housing H side of the base member 2 and engage the rotor housing H; and a fastening mechanism 8A which engages a head of a coupling bolt V inserted into one of the bolt insertion holes h1 other than the ones to be engaged with the rotor positioning members 9, to thereby impart a torque to the head of the coupling bolt V, and which is supported by the rotor support member 5 so as to bias the coupling bolt V to the rotor R.

Furthermore, a rotor attachment method using the above rotor attachment apparatus 1 includes: a first step of positioning the rotor R with respect to the rotor support member 5 by the rotor positioning members 9 before the rotor R is inserted into the rotor housing H; a second step of temporarily fixing the rotor support member 5 and the rotor R on each other by the temporary fixation bolt 7 after the first step; a third step of positioning the base member 2 with respect to the rotor housing H by the base positioning members 19; a fourth step of engaging a tip portion of the drive shaft 4 with a shaft end portion K1 of the crankshaft K after the second and third steps; a fifth step of rotating the drive shaft 4 to cause the ball screw mechanism B to move the rotor support member 5 and the rotor R toward the rotor housing H after the fourth step, to thereby insert the rotor R into the rotor housing H; a sixth step of releasing the temporary fixation by the temporary fixation bolt 7 and moving the rotor R away from the rotor support member 5 by a biasing force of the fastening mechanism 8A before the rotor R is completely inserted into the rotor housing H, to thereby make the rotor R movable within a range of a clearance between the rotor positioning members 9 and the bolt insertion holes h1; a seventh step of performing a positioning between the rotor R and the crankshaft K by engaging the rotor R with the shaft end portion K1 of the crankshaft K after the sixth step; an eighth step of tightening a coupling bolt V by the fastening mechanism 8A after the seventh step, to thereby partly couple the rotor R to the crankshaft K; and a ninth step of inserting coupling bolts V into the other bolt insertion holes h1 and tightening after the eighth step, to thereby completely couple the rotor R to the crankshaft K.

According to the above rotor attachment apparatus 1 and the above rotor attachment method using the rotor attachment apparatus 1, it is possible to handle a rotor R with comparatively low positioning accuracy before the rotor R is inserted into a rotor housing H. Therefore, it is possible to achieve the automatization and the stability of the rotor attachment operation using a commercially available robot. In addition, it is possible to simplify the construction of the rotor support member 5, the base member 2, and the like, and also to simplify attachment operation of the rotor R and the rotor housing H. Furthermore, after most portion of the rotor R is inserted into the rotor housing H, the rotor is temporarily put in a floating state and then the rotor R is directly positioned with respect to the crankshaft K. Therefore, it is possible to couple the crankshaft K to the rotor R with high accuracy.

The present invention is not limited to the above embodiment. For example, the number of rotor positioning members 9 can be appropriately modified in accordance with the number of bolt insertion holes h1 and screw holes h3. Therefore, the number of rotor positioning members 9 may be any number and is not limited to being three. Similarly, the number of base positioning members 19 can be appropriately modified.

Furthermore, a plurality of temporary fixation bolts 7 may be used. Similarly, it may be configured such that the fastening mechanism 8A has a plurality of sockets 8 and simultaneously imparts a torque and bias a plurality of coupling bolts V.

Furthermore, instead of the ball screw mechanism B, a normal screw mechanism that brings threads into sliding contact with each other may be used.

The configuration illustrated in the above embodiment is an exemplary, and a variety of modifications can be made without departing from the spirit or scope of the invention.

INDUSTRIAL APPLICABILITY

According to the present invention, it is possible to provide a rotor attachment apparatus and a rotor attachment method that makes it possible to automate attachment operation, and simplify a construction of an attachment apparatus and steps of the attachment operation, when a rotor of a motor is inserted into a rotor housing for coupling to a crankshaft of an engine.

The invention claimed is:

1. A rotor attachment apparatus for coupling a rotor of a motor to a crankshaft of an engine by inserting the rotor into a rotor housing that is attached to the engine when the motor is to be attached coaxially with the crankshaft, the rotor attachment apparatus comprising:
   a rotor support member that faces a lateral face of the rotor in an axis direction of the rotor;
   rotor positioning members that are protrudingly provided on the rotor support member and engage some of a plurality of bolt insertion holes provided in the rotor for coupling to the crankshaft;
   a temporary fixation bolt that temporarily fixes the rotor on the rotor support member in a state where the rotor is positioned with respect to the rotor support member by the rotor positioning members;
   a drive shaft which is arranged coaxially with the rotor, a tip portion of which is engaged with a shaft end portion of the crankshaft, and which supports the rotor support member movably in the axis direction via a screw mechanism;
   a base member that is arranged on a side of the rotor support member opposite to the rotor and moves the rotor support member toward and away from the rotor while rotatably supporting a base end of the drive shaft;
   base positioning members that are protrudingly provided on the rotor housing side of the base member and engage the rotor housing; and
   a fastening mechanism which engages a head of a coupling bolt inserted into at least one of the bolt insertion holes other than the ones to be engaged with the rotor positioning members, to thereby impart a torque to the head of the coupling bolt, and which is supported by the rotor support member so as to bias the coupling bolt toward the rotor.

2. A method for coupling a rotor of a motor to a crankshaft of an engine comprising:
   providing a rotor attachment apparatus operatively associated with the method and comprising:
   a rotor support member that faces a lateral face of a rotor of a motor in an axis direction of the rotor; rotor positioning members that are protrudingly provided on the rotor support member and engage some of a plurality of bolt insertion holes provided in the rotor for coupling to a crankshaft of an engine;
   a temporary fixation bolt that temporarily fixes the rotor on the rotor support member in a state where the rotor is positioned with respect to the rotor support member by the rotor positioning members;
   a drive shaft which is arranged coaxially with the rotor, a tip portion of which is engaged with a shaft end portion of the crankshaft, and which supports the rotor support member movably in the axis direction via a screw mechanism;
   a base member that is arranged on a side of the rotor support member opposite to the rotor and moves the rotor support member toward and away from the rotor while rotatably supporting a base end of the drive shaft;
   base positioning members that are protrudingly provided on the base member and engage the rotor housing that is attached to the engine; and
   a fastening mechanism which engages a head of a coupling bolt inserted into at least one of the bolt insertion holes other than the ones to be engaged with the rotor positioning members, to thereby impart a torque to the head of the coupling bolt, and which is supported by a rotor support member so as to bias the coupling bolt toward a rotor;
   the method further comprising:
   a first step of positioning the rotor with respect to the rotor support member by the rotor positioning members before the rotor is inserted into the rotor housing;
   a second step of temporarily fixing the rotor support member and the rotor on each other by the temporary fixation bolt after the first step;
   a third step of positioning the base member with respect to the rotor housing by the base positioning members;
   a fourth step of engaging a tip portion of the drive shaft with a shaft end portion of the crankshaft after the second and third steps;
   a fifth step of moving the rotor support member and the rotor toward the rotor housing by the drive shaft after the fourth step, to thereby insert the rotor into the rotor housing;
   a sixth step of releasing the temporary fixation by the temporary fixation bolt and spacing the rotor away from the rotor support member by a biasing force of the fastening mechanism before the rotor is completely inserted into the rotor housing, to thereby making the rotor movable within a range of a clearance between the rotor positioning members and the bolt insertion holes;
   a seventh step of performing a positioning between the rotor and the crankshaft by engaging the rotor with the shaft end portion of the crankshaft after the sixth step;
   an eighth step of tightening a coupling bolt by the fastening mechanism after the seventh step, to thereby partly couple the rotor to the crankshaft; and
   a ninth step of inserting coupling bolts into the other bolt insertion holes and tightening after the eighth step, to thereby completely couple the rotor to the crankshaft.

* * * * *